(12) United States Patent
Dal Bello et al.

(10) Patent No.: US 9,450,811 B2
(45) Date of Patent: Sep. 20, 2016

(54) ENTERPRISE WIDE SYSTEM AND METHODS FOR CONFIGURING, DIAGNOSING, AND UPDATING APPLIANCES

(71) Applicant: Electrolux Home Products, Inc., Cleveland, OH (US)

(72) Inventors: Giovanni Dal Bello, Reana del Rojale (IT); Marco Ragogna, Porcia (IT); Wilhelm Niessen, Selfkant (DE); Valdinei Frasson, Nuremberg (DE); Edi Fabbro, Bertiolo (IT); Claudio Diodato, Pagnacco (IT)

(73) Assignee: Electrolux Home Products, Inc., Charlotte, NC (US)

(*) Notice: Subject to any disclaimer, the term of this patent is extended or adjusted under 35 U.S.C. 154(b) by 43 days.

(21) Appl. No.: 14/031,516

(22) Filed: Sep. 19, 2013

(65) Prior Publication Data

US 2014/0019530 A1 Jan. 16, 2014

Related U.S. Application Data

(63) Continuation of application No. 12/614,840, filed on Nov. 9, 2009, now Pat. No. 8,554,516.

(60) Provisional application No. 61/117,654, filed on Nov. 25, 2008.

(51) Int. Cl.
*G05B 23/02* (2006.01)
*G06Q 10/00* (2012.01)
*H04L 12/24* (2006.01)

(52) U.S. Cl.
CPC .......... *H04L 41/0803* (2013.01); *G05B 23/02* (2013.01); *G06Q 10/00* (2013.01)

(58) Field of Classification Search
CPC .... G06Q 10/00; G06Q 10/063; G06Q 10/20; G07C 5/008; G07C 5/085; G07C 5/0808; G07C 5/006; G06F 17/30; G06F 17/30557; G06F 17/30864; G05B 15/02; G05B 23/02; H04L 41/0803; H04L 41/046; H04L 43/0876; H04L 67/34; H04N 21/214; H04N 21/4131; H04W 24/00
USPC .............. 702/184–185; 700/17, 83; 705/305; 707/812; 709/203, 217, 219–220, 223; 713/2
See application file for complete search history.

(56) References Cited

U.S. PATENT DOCUMENTS 4,275,464 A 6/1981 Schmidt
4,977,394 A 12/1990 Manson et al.
(Continued)

FOREIGN PATENT DOCUMENTS

JP 2001-195119 7/2001

*Primary Examiner* — Toan Le
(74) *Attorney, Agent, or Firm* — Vorys, Sater, Seymour and Pease LLP

(57) ABSTRACT

A system and methods to provide appliance field support personnel with a tool that, together with proper interface modules, simplifies the execution of diagnostic procedures and provides an easy way to configure, reconfigure, or update electronic boards in the home on a client side of an enterprise wide system. The electronic boards serve as electronic controllers in the appliances and are programmable generic service boards. With such a system, it is possible to update and re-configure electronic boards and interact directly with an electronic controller of an appliance while an appliance is operating. Software, configuration data, and control data are downloaded from a server-side configuration of the enterprise wide system to update the electronic boards.

19 Claims, 18 Drawing Sheets

(56) References Cited

U.S. PATENT DOCUMENTS

| | | |
|---|---|---|
| 5,678,002 A | 10/1997 | Fawcett et al. |
| 5,987,105 A | 11/1999 | Jenkins et al. |
| 6,121,593 A | 9/2000 | Mansbery et al. |
| 6,160,477 A | 12/2000 | Sandelman et al. |
| 6,357,017 B1 | 3/2002 | Bereiter et al. |
| 6,772,096 B2 | 8/2004 | Murakami et al. |
| 6,873,255 B2 | 3/2005 | Gallagher |
| 6,909,992 B2 | 6/2005 | Ashley |
| 7,200,450 B2 | 4/2007 | Boyer et al. |
| 7,315,251 B1 | 1/2008 | Holland et al. |
| 8,040,234 B2 | 10/2011 | Ebrom et al. |
| 8,554,516 B2 * | 10/2013 | Dal Bello et al. ............ 702/185 |
| 2001/0054161 A1 | 12/2001 | Woodruff |
| 2002/0111950 A1 | 8/2002 | Lee |
| 2002/0161885 A1 | 10/2002 | Childers et al. |
| 2002/0183978 A1 | 12/2002 | Koyama et al. |
| 2003/0037293 A1 | 2/2003 | Owhadi |
| 2004/0162884 A1 | 8/2004 | Jeon |
| 2005/0027827 A1 | 2/2005 | Owhadi et al. |
| 2005/0120112 A1 | 6/2005 | Wing et al. |
| 2005/0177761 A1 | 8/2005 | Martiniere |
| 2005/0203647 A1 * | 9/2005 | Landry et al. .................. 700/83 |
| 2006/0233114 A1 | 10/2006 | Alam et al. |
| 2008/0034060 A1 | 2/2008 | Fisher, Jr. |
| 2008/0188963 A1 | 8/2008 | McCoy |
| 2008/0287121 A1 | 11/2008 | Ebrom et al. |
| 2009/0132070 A1 * | 5/2009 | Ebrom .................. D06F 39/005 700/90 |
| 2009/0327932 A1 | 12/2009 | Ebrom et al. |

* cited by examiner

ENTERPRISE WIDE SYSTEM AND METHODS FOR CONFIGURING, DIAGNOSING, AND UPDATING APPLIANCES

This U.S. Patent Application is a continuation patent application of U.S. patent application Ser. No. 12/614,840 filed on Nov. 9, 2009, now U.S. Pat. No. 8,554,516, which is incorporated herein by reference in its entirety and which claims priority to and the benefit of U.S. provisional patent application Ser. No. 61/117,654 filed on Nov. 25, 2008.

TECHNICAL FIELD

Certain embodiments relate to enterprise wide solutions. More particularly, certain embodiments relate to an enterprise wide system and methods for configuring, diagnosing, and updating appliances.

BACKGROUND

The servicing and repair of home appliances such as refrigerators, dish washers, washing machines, clothes dryers, and other such appliances has often presented many logistical, cost, and customer satisfaction challenges. From diagnosing a problem, ordering spare parts, and actually fixing the problem, the cost, time, and labor associated with such activities has been a burden on both the customer and the appliance providing enterprise.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention comprise a system and methods to provide appliance field support personnel with a tool that, together with proper interface modules, simplifies the execution of diagnostic procedures and provides an easy way to configure, reconfigure, or update electronic boards in the home. The electronic boards serve as electronic controllers in the appliances and are programmable generic service boards. With such a system, it is possible to update and re-configure electronic boards and interact directly with an electronic controller of an appliance while an appliance is operating.

The system includes a client software application allowing configuration of generic electronic control boards to create a spare electronic board for a specified appliance whenever repairing the appliance requires the replacement of an electronic control board. The client software application also allows updates and patches to be applied to the board without replacing the physical board in order to satisfy customer complaints. The client software application also provides automatic identification of an appliance, display of internal parameters, and diagnosis of the appliance. Diagnostic procedures may be launched and subsequent alarm codes are described in a clear textual format which helps avoid having to refer to service manuals.

The system may result in less repeated repair calls, less spare parts required in the field, a higher quality of repair, more accurate diagnosis of faults, less cost, and automatic data collection about service activities. The system may further result in less client visits required, higher customer satisfaction, and faster response times.

An embodiment of the present invention comprises an enterprise wide system to provide appliance field support for a plurality of appliance types. The enterprise wide system includes a client-side configuration including a portable field computer having a client software application residing thereon providing a universal user interface which is common across all appliance types of the enterprise wide system. The client-side configuration also includes an appliance capable of operatively communicating with the portable field computer and having a programmable generic service board capable of being programmed for any appliance type of the enterprise wide system. The enterprise wide system further includes a server-side configuration including a web server, a central system database server operatively connected to the web server, a product software storage (PSS) database server operatively connected to the central system database server, and a technical documentation system (TDS) database server operatively connected to the central system database server. The enterprise wide system also includes a network capable of communicatively connecting the portable field computer of the client-side configuration to the web server of the server-side configuration.

Another embodiment of the present invention comprises a client-side configuration of an enterprise wide system to provide appliance field support. The client-side configuration includes a portable field computer capable of accessing a web server of a server-side configuration of the enterprise wide system via a network. The client-side configuration also includes a client software application residing on the portable field computer and including computer-executable instructions providing a uniform user interface which is independent of an appliance type under test and which is common across all appliances of the enterprise wide system. The client-side configuration further includes an appliance capable of operatively communicating with the portable field computer, wherein the appliance includes a programmable generic service board capable of being programmed for any appliance type of the enterprise wide system. The programmable generic service board includes reprogrammable memories. The client-side configuration may also include an appliance connection kit capable of being used to operatively connect the portable field computer to the programmable generic service board of the appliance to facilitate communicating. In accordance with an embodiment of the present invention, the portable field computer communicates wirelessly with the appliance. However, in accordance with other embodiments, the portable field computer may communicate via wired means, or wirelessly, with the appliance using any of many different types of technologies. The portable field computer is capable of operatively interacting with the programmable generic service board of the appliance while the appliance is operating. Also, the portable field computer is further capable of downloading any of software, control data, and configuration data directly from a web server of a server-side configuration of the enterprise wide system via a network. Furthermore, the portable field computer is capable of being used to select to diagnose the appliance or to select to configure the programmable generic service board of the appliance. The portable field computer is also capable of automatically identifying the appliance when operatively connected thereto. The client software application includes computer-executable instructions providing a monitor form capable of being displayed by the portable field computer to show a current state of the appliance. The client software application also includes computer-executable instructions providing a troubleshooting procedure and for displaying a series of dialog boxes that guide a user towards an actual reason for a detected fault. The client software application further includes computer-executable instructions providing a graph form capable of being displayed by the portable field computer to show an evolution, over time, of at least one relevant parameter during diagnostic operations. Furthermore, the client software application may include computer-executable instructions providing an update dialog box capable of being displayed by the portable field computer to facilitate the updating of the programmable generic service board with any of software, control data, and configuration data from a web server of a server-side configuration of the enterprise wide system via a network. The portable field computer is also capable of reporting service information back to a web server of a server-side configuration of the enterprise wide system via a network. The portable field computer is further capable of receiving instructions from a web server of a server-side configuration of the enterprise wide system via a network instructing a user of the portable field computer to perform certain actions to verify malfunctioning of the appliance.

A further embodiment of the present invention comprises a server-side configuration of an enterprise wide system to provide appliance field support. The server-side configuration includes a web server, serving as a portal site, capable of being accessed by a portable field computer of a client-side configuration of the enterprise wide system via a network. The server-side configuration also includes a first database server operatively connected to the web server, a second database server operatively connected to the first database server, and a third database server operatively connected to the first database server. The first database server is a central system database server storing at least one of appliance software updates, appliance configuration data, and appliance control data. The second database server is a product software storage (PSS) database server. The PSS database server is a SQL database server capable of receiving and storing data for programmable generic service boards from factory personnel and research and development personnel throughout the enterprise wide system. The PSS database server stores data for each manufactured appliance of the enterprise wide system, wherein the data includes at least firmware and configuration files. The third database server is a technical documentation system (TDS) database server. The TDS database server is a SQL database server capable of receiving technical documentation of appliances from at least one factory computer-based apparatus located at a factory of the enterprise wide system and from at least one research and development computer-based apparatus located at a research and development facility of the enterprise wide system via a second network. The server-side configuration may further include at least one factory computer-based apparatus located at a factory of the enterprise wide system and operatively connected to at least one of the second database server and the third database server via a second network. The server-side configuration may also include at least one research and development computer-based apparatus located at a research and development facility of the enterprise wide system and operatively connected to at least one of the second database server and the third database server via a second network. The web server includes a web service portion allowing clients, via portable field computers, to download data and software updates from the first database server. The server-side configuration provides an open architecture through integration with web services and provides an extensible test executive through .NET plugins. The server-side configuration may also include at least one firewall and at least one virtual private network (VPN) operatively implemented to provide protection against unauthorized electronic access to the server-side configuration of the enterprise wide system. The web server hosts a web site allowing both individual technicians and service centers to request licenses, and allowing administrators to manage licenses, accounts, roles, and logs.

Another embodiment of the present invention comprises a method to provide appliance field support for an enterprise wide system having a client side and a server side. The method includes operatively connecting a portable field computer to a generic electronic control board of an appliance and operatively connecting the portable field computer to a network on a client side of the enterprise wide system. The method also includes downloading at least one of configuration data and control data from a server, operatively connected to the network on a server side of the enterprise wide system, to the portable field computer. The method further includes updating the generic electronic control board by electronically transferring at least a portion of the configuration data and/or the control data from the portable field computer to the generic electronic control board. The method also includes commanding the portable field computer to perform a diagnostic procedure on the appliance via the generic electronic control board while the appliance is operating. In accordance with various embodiments, the generic electronic control board may or may not be installed in the appliance during the updating. At least one of the updating step and the downloading step of the method may use a product number code (PNC)/engineering level code (ELC) to identify a model of the appliance. Alternatively, at least one of the updating step and the downloading step of the method may use a service kit code (SKC) to identify a spare part for the generic electronic control board. The method may further include the portable field computer displaying a current state of the appliance and/or displaying a graph showing an evolution over time of at least one relevant parameter during the diagnostic procedure. The method may also include the portable field computer reporting service information back to a web server on the server side of the enterprise wide system via the network in response to performing the diagnostic procedure and/or receiving instructions from a web server on the server side of the enterprise wide system via the network instructing a user of the portable field computer to perform certain actions to verify malfunctioning of the appliance. The method may further include transmitting data for the generic electronic control board from a factory computer-based apparatus located at a factory of the enterprise wide system to at least one of a product software storage (PSS) database server and a technical documentation system (TDS) database server on a server side of the enterprise wide system. The method may further include transmitting data for the generic electronic control board from a research and development computer-based apparatus located at a research and development facility of the enterprise wide system to at least one of a product software storage (PSS) database server and a technical documentation system (TDS) database server on a server side of the enterprise wide system. The method may also include a user of the portable field computer requesting a license, via the network, from a web site hosted on a web server on a server side of the enterprise wide system.

The method may also include an administrator of the enterprise wide system managing licenses, accounts, roles, and logs from a web site hosted on a web server on a server side of the enterprise wide system. The method may further include a user of a computer-based apparatus at a service center of the enterprise wide system requesting a license from a web site hosted on a web server on a server side of the enterprise wide system.

These and other features of the claimed invention, as well as details of illustrated embodiments thereof, will be more fully understood from the following description and drawings.

DETAILED DESCRIPTION

Various embodiments and features of the present invention, as described herein, may be referred to with respect to the term "sidekick" (e.g., the sidekick system, the sidekick architecture, the sidekick PC, etc.). The terms "board", "generic board", "electronic board", "programmable generic service board", "programmable generic electronic board", "control board", "reconfigurable circuit board", "generic electronic control board", and "electronic controller" of an appliance are used herein interchangeably.

Figure 1:
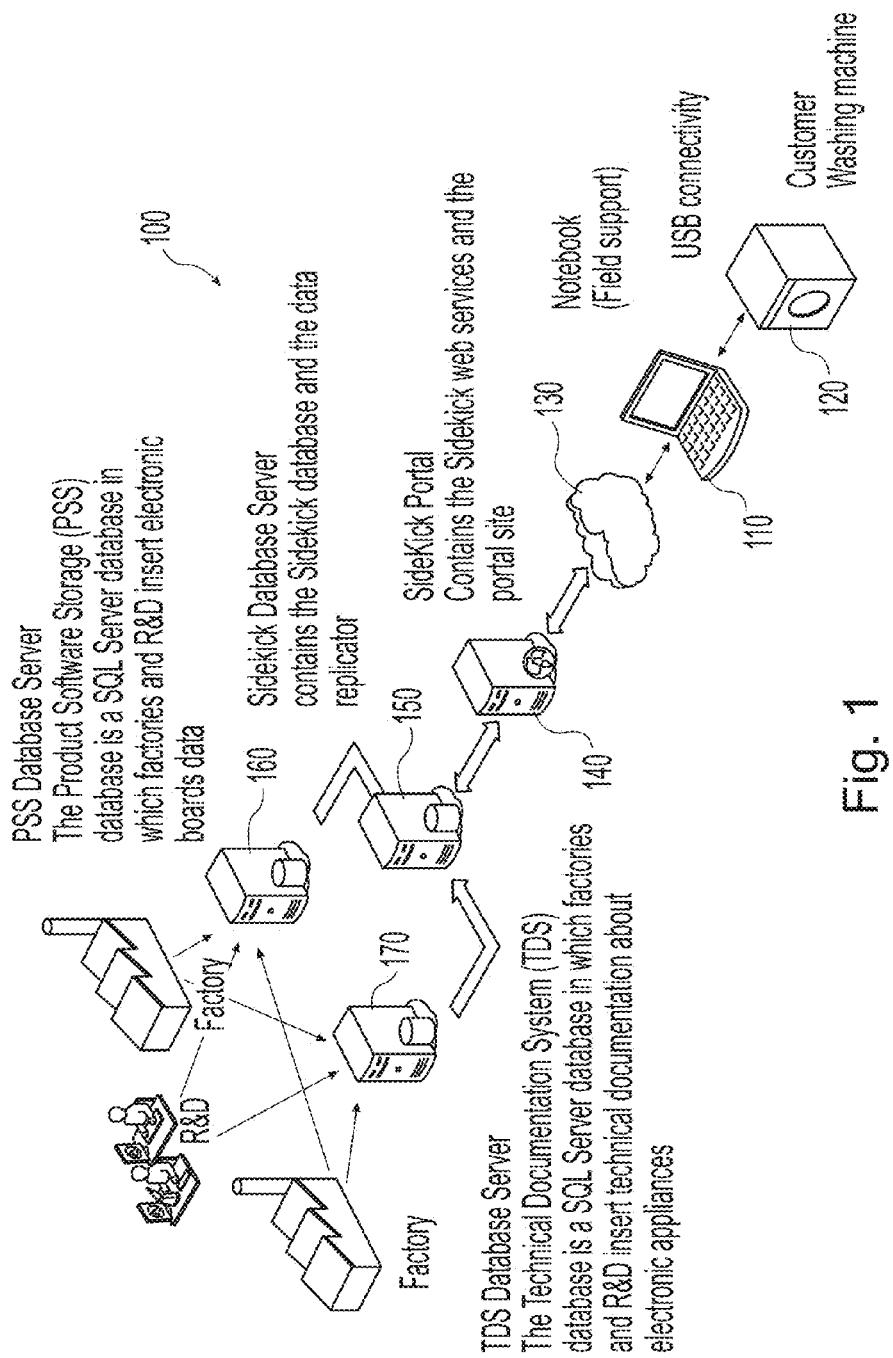
FIG. 1 illustrates an exemplary embodiment of the general architecture of an enterprise wide system for configuring, diagnosing, and updating appliances.

FIG. 1 illustrates an exemplary embodiment of the general architecture of an enterprise wide system 100 for providing appliance field support such as, for example, configuring, diagnosing, and updating appliances. The system 100 provides web service integration and local databases having information about the various appliance models. The system 100 provides an open architecture through integration with web services and provides an extensible test executive through .NET plugins, in accordance with an embodiment of the present invention. Continuous improvements may be delivered via the internet.

The system 100 includes a personal computer (PC) 110 (e.g., a portable field computer) that is capable of interfacing (operatively connecting) between an appliance 120 and a network 130 such as, for example, the internet or an intranet. The PC may be of any various types such as, for example, a notebook PC, a desktop PC, a personal digital assistant (PDA), or a mobile telephone. The system 100 also includes a web server 140 capable of being accessed via the network 130 and providing web services and serving as a portal site.

The system 100 further includes a central system database server 150 (a first database server) operatively connected to the web server 140. The system database server 150 contains the system database and replication capability. The system 100 also includes a product software storage (PSS) database server 160 (a second database server) and a technical documentation system (TDS) database server 170 (a third database server) each operatively connected to the central system database server 150.

The PSS database server 160 is a SQL server database in which factory and research and development personnel may insert data for electronic boards (e.g., programmable generic service boards). The PSS database server 160 contains all data for each manufactured product (appliance) including firmware and configuration files. Such data may be replicated daily, for example, from a computer-based apparatus located at each factory or research and development facility towards the PSS 160. The TDS database server 170 is a SQL server database in which factory and research and development personnel may similarly insert technical documentation about electronic appliances. The TDS server 170 provides information on spare parts, user manuals, service manuals, and service bulletins.

Figure 2:
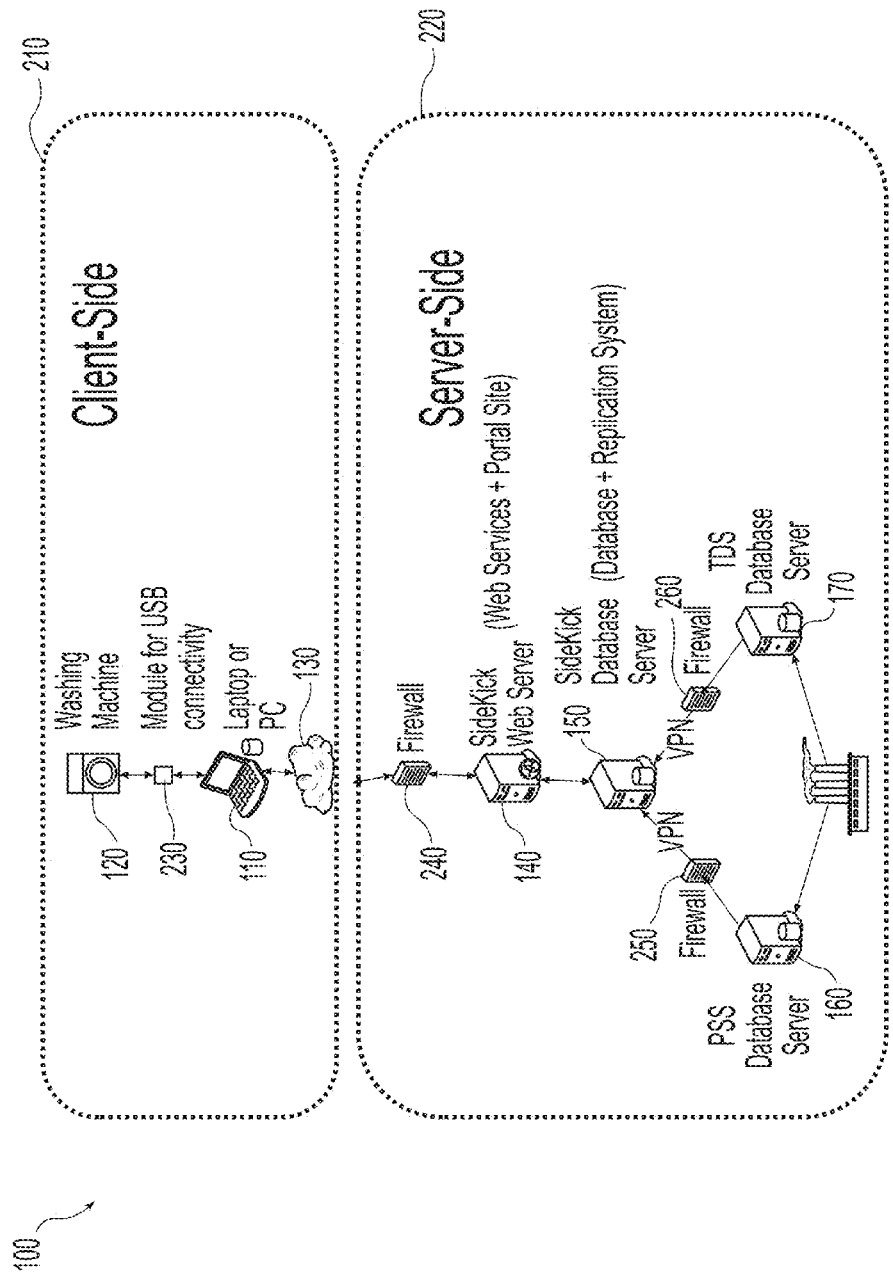
FIG. 2 illustrates a slightly more detailed embodiment of the general architecture of FIG. 1, delineating a client side and a server side.

FIG. 2 illustrates a slightly more detailed embodiment of the general architecture of FIG. 1, delineating a client side configuration 210 and a server side configuration 220. The client side 210 includes the PC 110, the appliance 120, and the network 130. The client side 210 further includes connectivity hardware 230 for connecting the PC 110 to an electronic board of the appliance 120. The network 130 may be considered a part of the server side 220 or may be considered to be between the client side 210 and the server side 220, in accordance with various other embodiments of the present invention.

The connectivity hardware 230 may include various cables and a communication module as described later herein. For example, the connectivity hardware 230 may allow for a universal serial bus (USB) interface between the PC 110 and the appliance 120. An appliance connection kit provides a USB module and all cables that allow operative communication between the PC 110 and the appliance under test 120. In accordance with another embodiment of the present invention, the connectivity hardware 230 may be replaced by a wireless connection.

The connection configuration may include a personal digital assistant (PDA), a mobile telephone, or a notebook computer capable of connecting to the server side portal via the network 130, and capable of connecting to an electronic board of the appliance 120 via a proper connector cable or via a wireless connection (e.g., a Bluetooth® connection) in order to download software directly from the server side portal. For example, a user may connect and enter a code of the appliance 120, causing the system 100 to automatically provide the user with the last update/upgraded version of the software. It is possible to update and re-configure electronic boards and interact directly with an electronic controller of an appliance (e.g., to perform a diagnostic procedure) while an appliance is operating.

The server side 220 includes the web server 140, the system database server 150, the PSS database server 160, and the TDS database server 170. Several firewalls may exist at various points in the architecture. A firewall 240 may exist between the network 130 on the client side 210 and the web server 140 on the server side 220. Furthermore, a firewall 250 may exist between the system database server 150 and the PSS database server 160. Also, a firewall 260 may exist between the system database server 150 and the TDS database server 170. The system database server 150 may communicate with each of the PSS database server 160 and the TDS database server 170 over a virtual private network (VPN), for example. The firewalls and the VPN serve to protect against unauthorized electronic access to the server side 220 of the system 100.

The PC 110 (also known as the sidekick PC because it acts as a sidekick to the field technician) runs a client software application. The client software application includes a plurality of computer-executable instructions for performing certain client-side functions as described herein. For example, the client software application provides a uniform (i.e., universal) user interface approach to field service activities, regardless of the actual appliance type under test (i.e., the user interface is common across all appliances of the enterprise). A sidekick portal section of the web server 140 provides a centralized and easy tool for all management activities. A sidekick web site hosted on the web server 140 allows both individual technicians or service centers to request licenses and administrators to manage licenses, accounts, roles, log, etc. A sidekick web service portion of the web server 140 allows clients (via a PC 110) to download updates from the database server 150.

Information may be retrieved regarding configuration and diagnostic data from a replica obtained from the PSS 160. The PSS 160 contains information about electronic appliances from many production plants and its contents are updated daily. Data is encrypted prior to sending the data to the service operators that are involved in a field test. Such encryption protects the intellectual property of the enterprise. Only the client software application is able to decrypt the information. The client software application may support a plurality of languages (e.g., English, Italian, Spanish, French).

Figure 3:
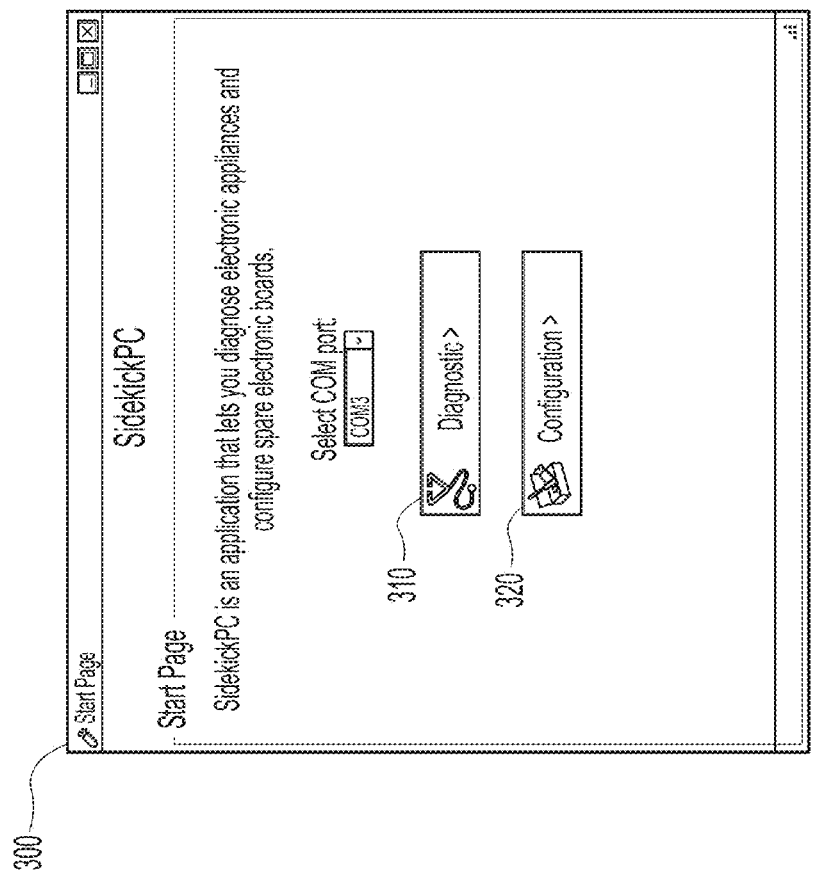
FIG. 3 illustrates an exemplary embodiment of a start page as displayed by a client software application on a client PC in the field.

FIG. 3 illustrates an exemplary embodiment of a start page 300 as displayed by a client software application on a client PC 110 in the field. The start page 300 allows a user of the client software application to select a desired operation. For example, the user may select to diagnose an appliance 310 or configure a control board for the appliance 320.

Figure 4:
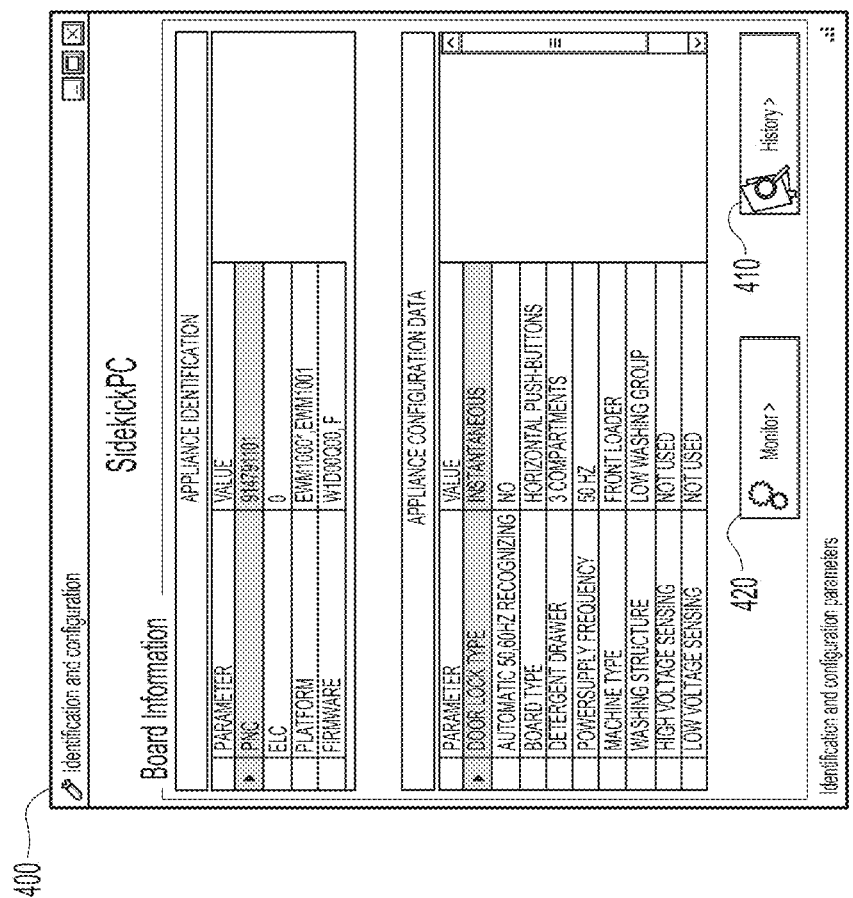
FIG. 4 illustrates an exemplary embodiment of a diagnostic features identification form as displayed by a client software application on a client PC in the field.

FIG. 4 illustrates an exemplary embodiment of a diagnostic features identification form 400 as displayed by a client software application on a client PC 110 in the field. If the user chooses the diagnostic option 310, then the client software application on the PC 110 connects to the electronic board in the appliance 120 and automatically identifies the appliance under test 120. The identification form 400 displays identification and configuration data, an example of which is shown in FIG. 4. The user may then select the history option 410 or the monitor option 420.

Figure 5:
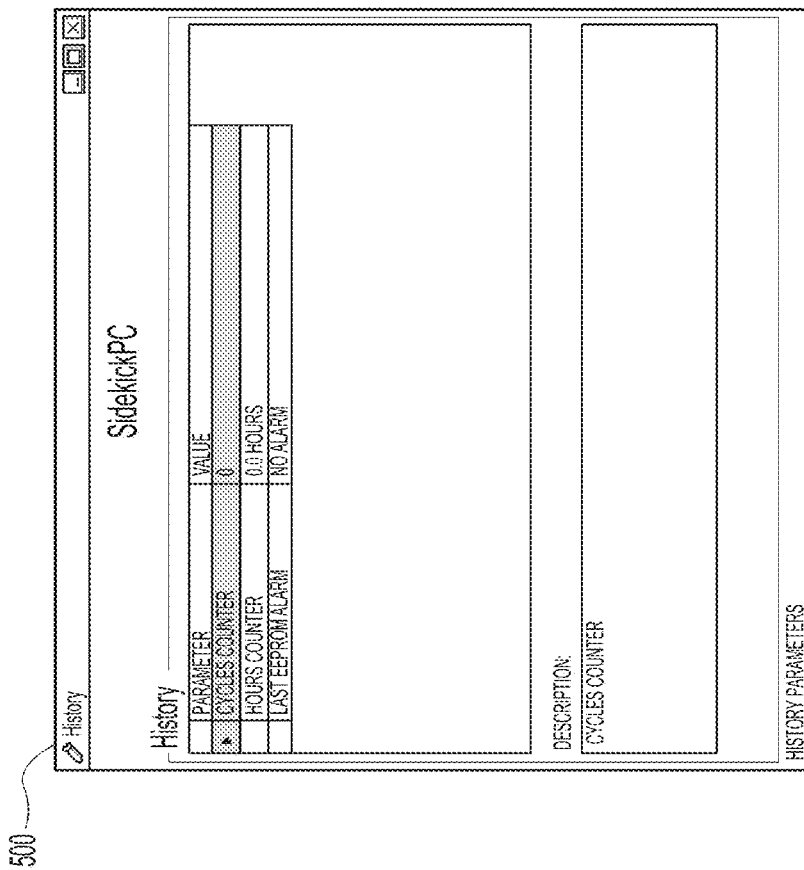
FIG. 5 illustrates an exemplary embodiment of a diagnostic features history form as displayed by a client software application on a client PC in the field.
Figure 6:
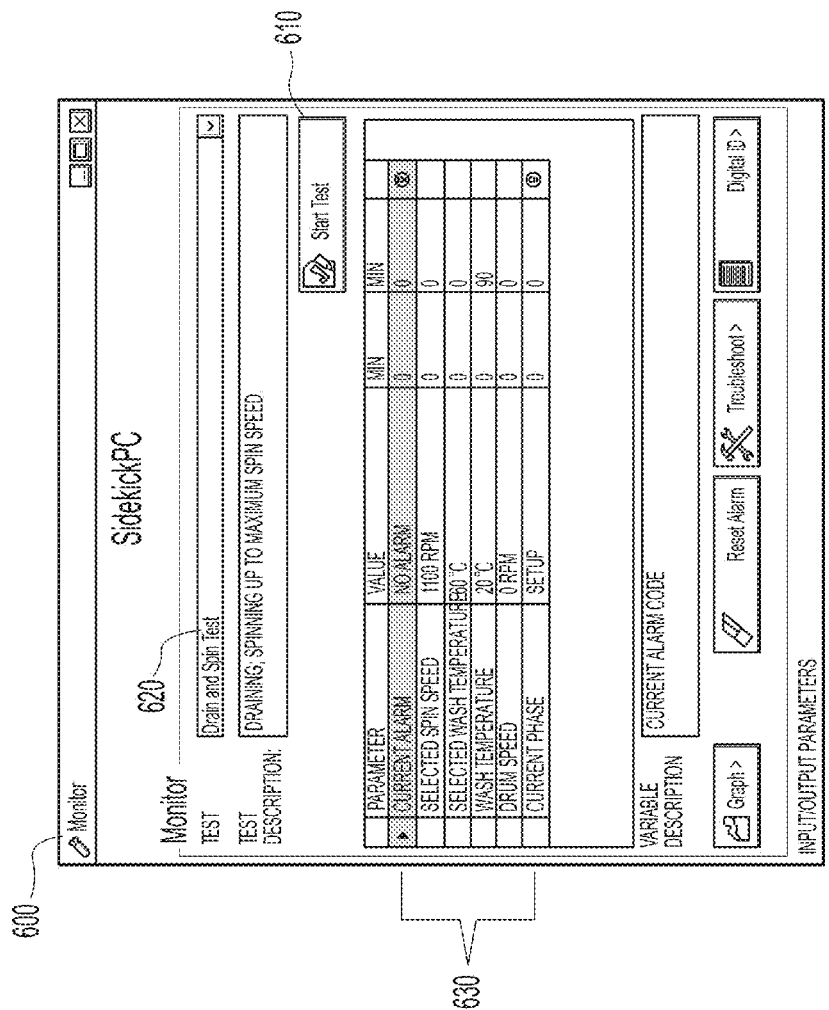
FIG. 6 and FIG. 7 illustrate an exemplary embodiment of a diagnostic features monitor form as displayed by a client software application on a client PC in the field.
Figure 7:
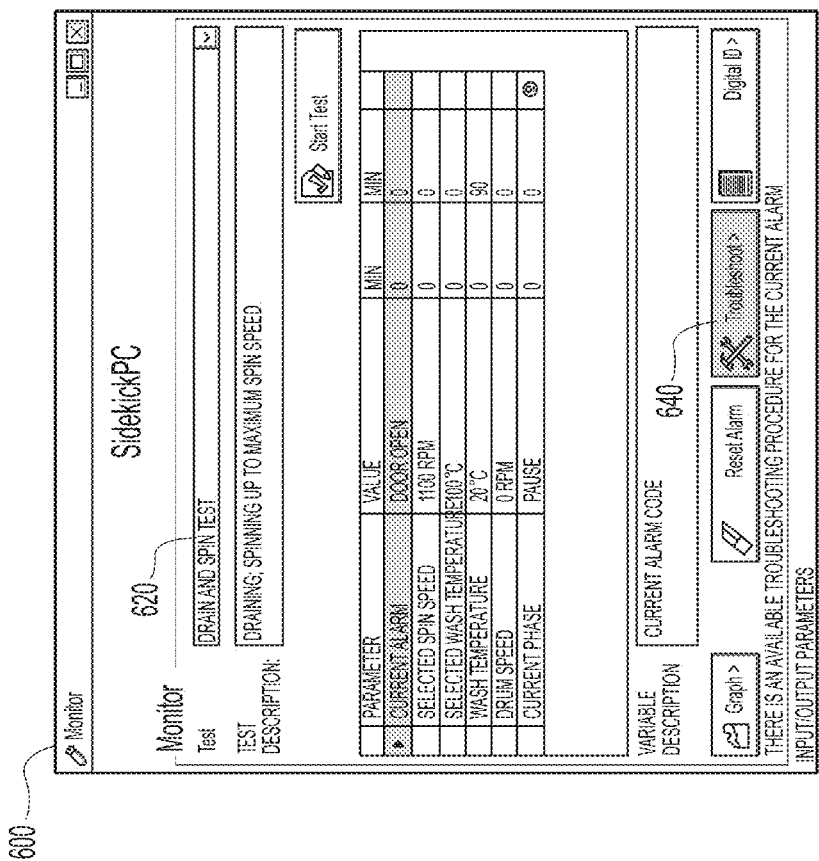

FIG. 5 illustrates an exemplary embodiment of a diagnostic features history form 500 as displayed by a client software application on a client PC 110 in the field. When the history option 410 is selected, a history form 500 shows counters and other information about the past operation of the appliance, if available. FIG. 6 and FIG. 7 illustrate an exemplary embodiment of a diagnostic features monitor form 600 as displayed by a client software application on a client PC 110 in the field. When the monitor option 420 is selected, a monitor form 600 shows the current state 630 of the appliance under test 120. The monitor form 600 allows the user to execute diagnostic activities. Selecting the start test command 610 allows a selected diagnostic test 620 to be performed. Selecting the troubleshoot command 640 allows a troubleshooting procedure to be displayed and selected.

Figure 8:
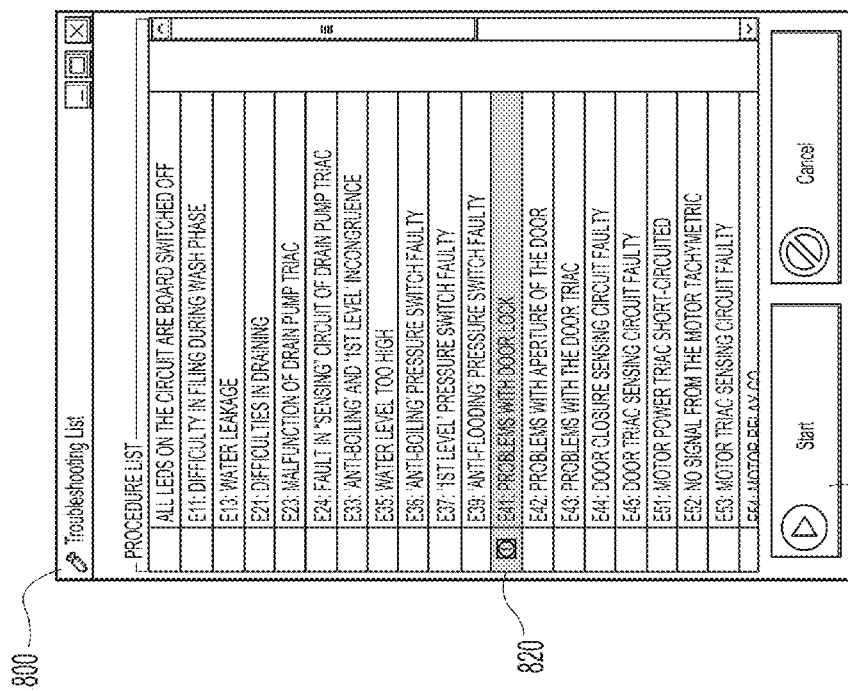
FIG. 8 illustrates an exemplary embodiment of a diagnostic features troubleshooting list as displayed by a client software application on a client PC in the field.

FIG. 8 illustrates an exemplary embodiment of a diagnostic features troubleshooting list 800 as displayed by a client software application on a client PC 110 in the field. The troubleshooting procedure may be selected from the troubleshooting list 800 which depends on the appliance under test 120. Selecting the start command 810 allows the selected troubleshooting procedure 820 to begin.

Figure 9:
FIG. 9 illustrates an exemplary embodiment of a diagnostic features troubleshooting procedure as displayed by a client software application on a client PC in the field.
Figure 10:
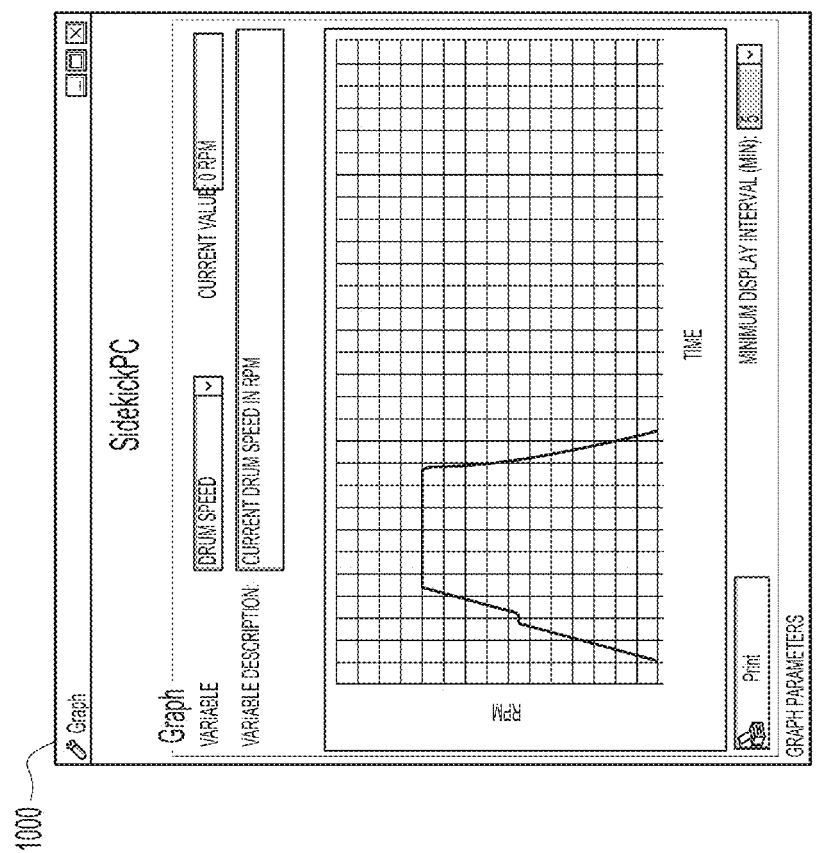
FIG. 10 illustrates an exemplary embodiment of a diagnostic features graph form as displayed by a client software application on a client PC in the field.
Figure 11:
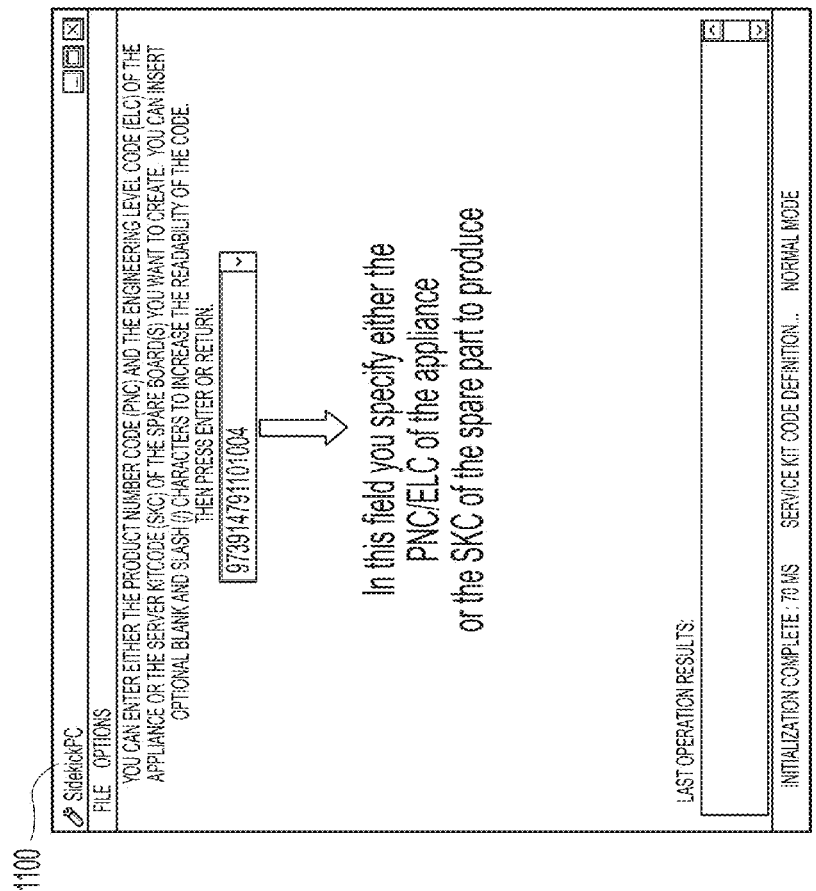
FIGS. 11-14 illustrate an exemplary embodiment of a board configuration features form as displayed by a client software application on a client PC in the field.
Figure 12:
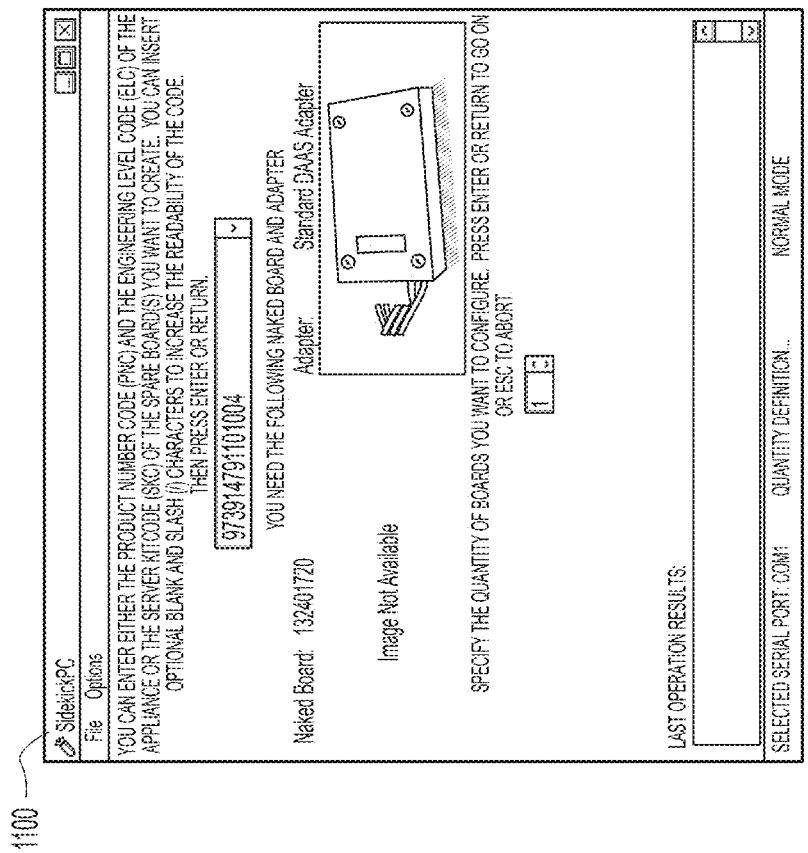
Figure 13:
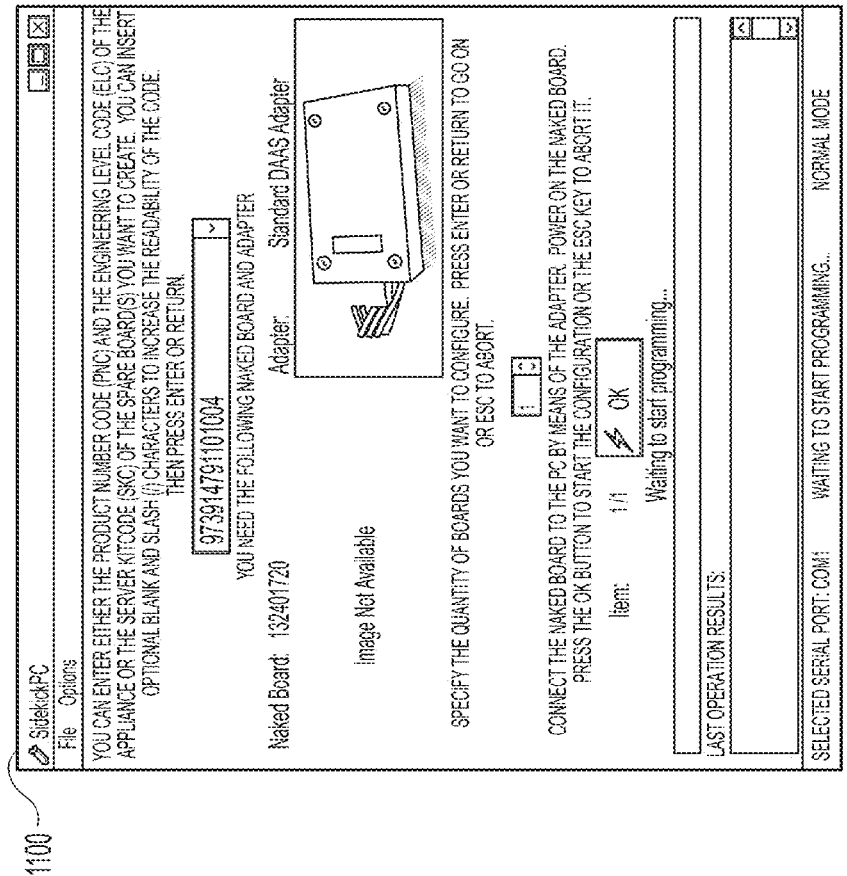
Figure 14:
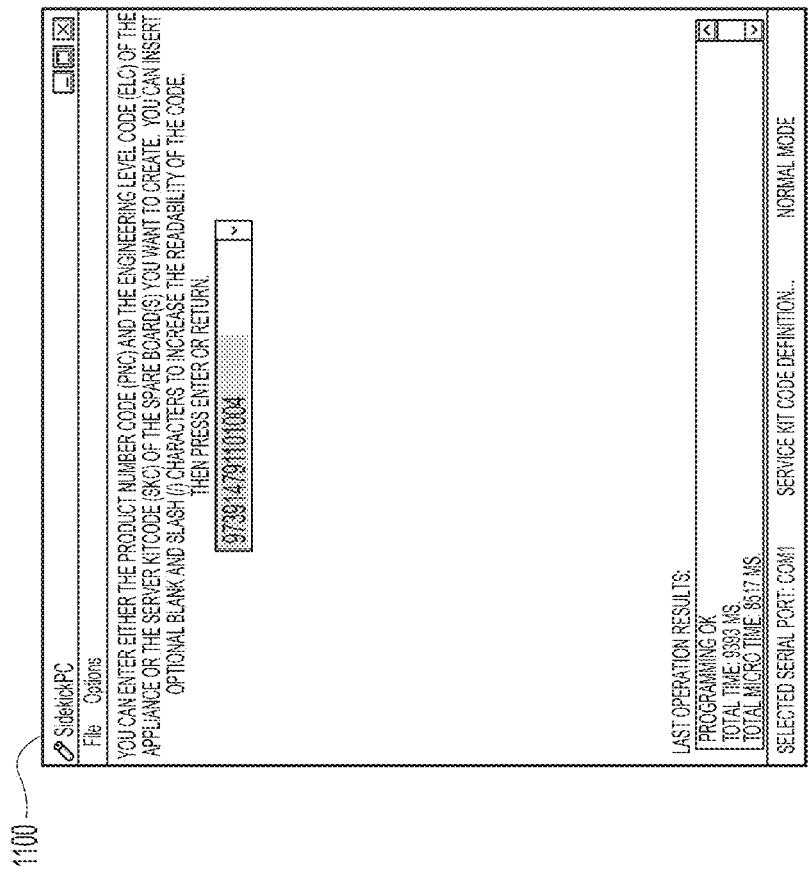

FIG. 9 illustrates an exemplary embodiment of a diagnostic features troubleshooting procedure 900 as displayed by a client software application on a client PC 110 in the field. A troubleshooting procedure 900 includes a series of dialog boxes that guide a user towards the actual reason of a detected fault. FIG. 10 illustrates an exemplary embodiment of a diagnostic features graph form 1000 as displayed by a client software application on a client PC 110 in the field. The graph form 1000 shows the evolution over time of relevant parameters (e.g., current drum speed) during diagnostic operations.

FIGS. 11-14 illustrate an exemplary embodiment of a board configuration features form 1100 as displayed by a client software application on a client PC 110 in the field. If the user chooses the "configure a control board" option 320 from the start page 300, the configuration form 1100 is displayed. The configuration form 1100 allows a user to configure (or update) an electronic board starting either from the product number code (PNC)/engineering level code (ELC) which identifies the appliance model, or from the corresponding service kit code (SKC) which identifies the spare part for the electronic board. After specifying the code, the number of boards to configure may be inserted (see FIG. 12). After specifying the number of boards to configure, the configuration of the board or the update of the appliance may be started (see FIG. 13). In accordance with an embodiment of the present invention, the board configuration process takes a reasonable amount of time (e.g., anywhere from 10 to 60 seconds). When the configuring is completed, the result (e.g., programming OK, programming FAILED, total time) of the operation is displayed (see FIG. 14).

In accordance with an embodiment of the present invention, the electronic boards have reprogrammable memories (e.g., flash microcontrollers). The electronic design is based on platforms with software update and reconfiguration capabilities. The control firmware on the board may be completely reprogrammed using a standard protocol. A few programmable generic electronic board types are able to effectively replace a large number of different models/boards in various appliances. As used herein, the term generic board refers to an electronic board that is universal in the sense that it may be programmed to accommodate an appliance for any model of the appliance or for any appliance type of the enterprise wide system.

A standard interface is provided (hardware/connector and communication protocol) which is easily accessible by field service technicians or engineers. The control firmware is organized to allow access (read and write) to all key information linked to the product process control. A board may be configured to customize a generic spare part board to change a defective board of an appliance, to fix a "bug" on the board of the appliance, or to upgrade/update the board of an appliance to a latest version, all within the home of a customer.

Figure 15:
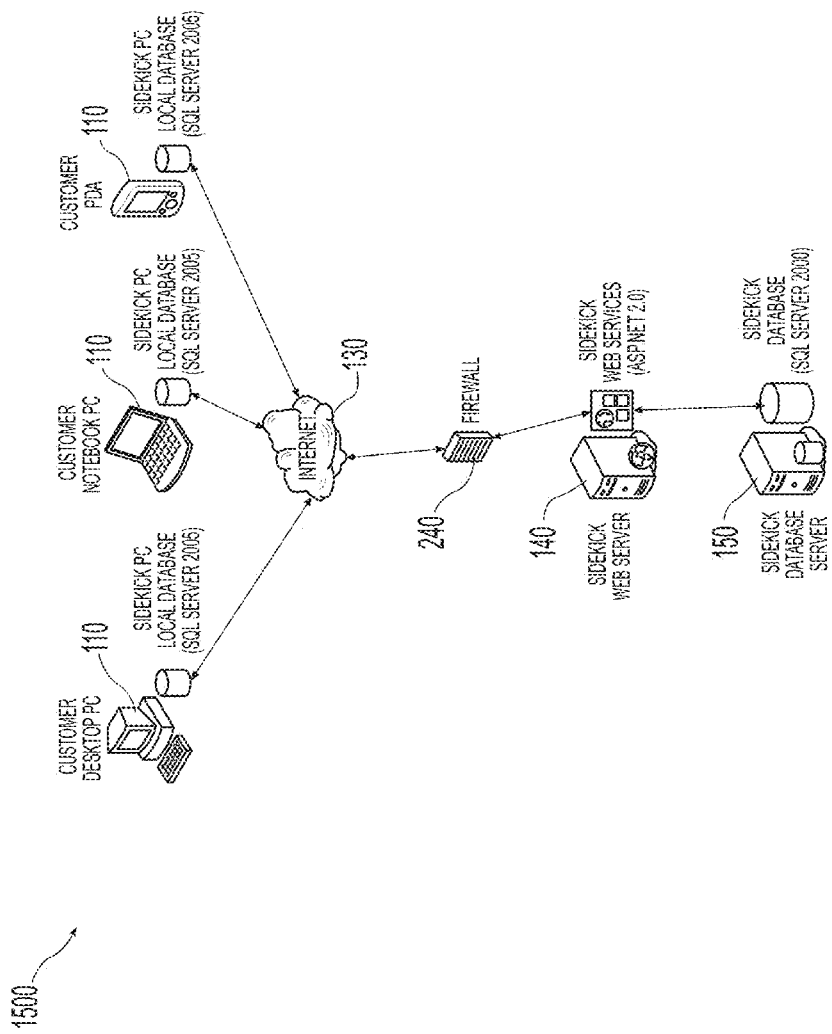
FIG. 15 illustrates an exemplary embodiment of a web service architecture of an enterprise wide system for configuring, diagnosing, and updating appliances.
Figure 16:
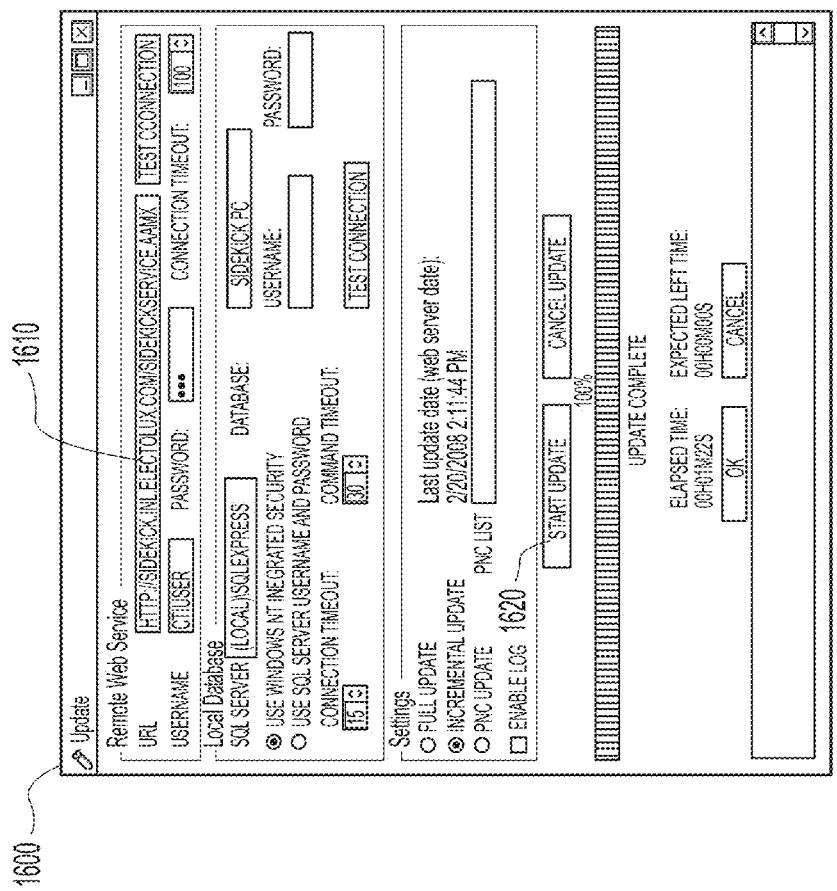
FIG. 16 illustrates an exemplary embodiment of an update dialog box as displayed by a client software application on a client PC.

FIG. 15 illustrates an exemplary embodiment of a web service architecture 1500 of an enterprise wide system for configuring, diagnosing, and updating appliances. In the architecture 1500, a plurality of users may connect to the web server 140 via the network 130. The sidekick web service allows clients, via a sidekick client PC 110 (e.g., a desktop PC, a notebook PC, a PDA), to download updates from the central sidekick database 150. FIG. 16 illustrates an exemplary embodiment of an update dialog box 1600 as displayed by a client software application on a personal computer 110. The sidekick web service integrates with the sidekick PC 110. Field service engineers may periodically obtain updates (e.g., software, control data, configuration data) from the central database 150 by means of the update dialog box 1600 in the sidekick PC 110. The web service is accessed by means of an internet or intranet URL 1610. The "start update" button 1620 allows the update operation to begin on the local database.

Figure 17:
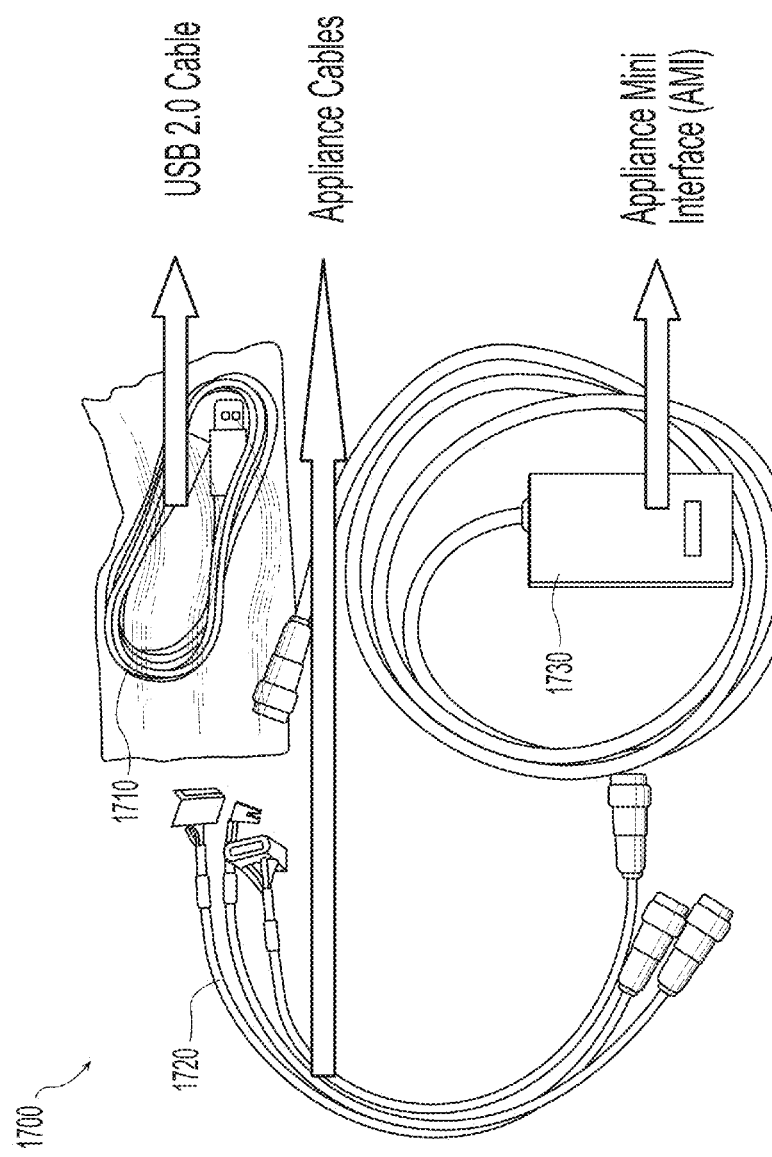
FIG. 17 illustrates an exemplary embodiment of an appliance connection kit used to connect a client PC to an appliance in the field.
Figure 18B:
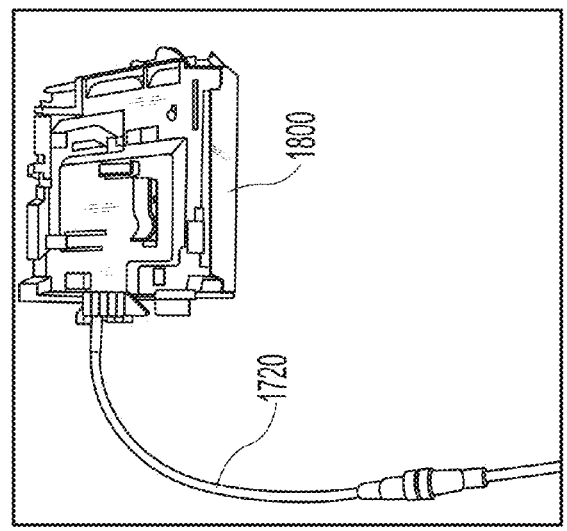
FIGS. 18A-18B illustrate an exemplary embodiment of the appliance connection kit of FIG. 17 connected to a generic reconfigurable circuit board of an appliance.
Figure 18A:
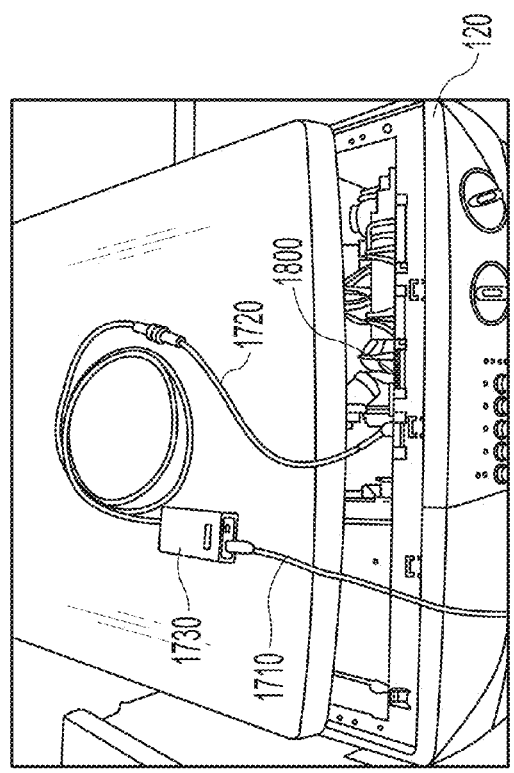

FIG. 17 illustrates an exemplary embodiment of an appliance connection kit 1700 used to connect a personal computer 110 to an appliance 120 in the field. The kit 1700 includes a USB cable 1710, appliance cables 1720, and an Appliance Mini Interface (AMI) 1730 (i.e., a communication module). FIGS. 18A-18B illustrate an exemplary embodiment of the appliance connection kit 1700 of FIG. 17 connected to a generic reconfigurable circuit board 1800 (i.e., a generic electronic control board also known as a programmable generic service board) of an appliance 120. The USB cable 1710 is connected between the PC 110 and the AMI 1730. An appliance cable 1720 is connected between the AMI 1730 and the board 1800 of the appliance 120. The board 1800 may be configured or updated while installed in the appliance 120 (FIG. 18A) or while uninstalled (FIG. 18B). In accordance with another embodiment of the present invention, the connection kit 1700 may be simplified by providing a single cable connecting the client PC 110 to the reconfigurable circuit board 1800 of the appliance 120, for example, via a USB port provided directly on the appliance 120 and accessible from the outside without having to open the appliance.

In accordance with an embodiment of the present invention, the client PC 110 may report service information back to the server side 220 of the system 100 via the network 130. Such service information may include, for example, diagnostic results and resolution steps taken. Cost information and labor time may also be reported in this manner. The user may connect a PC 110 to the electronic board 1800 (wirelessly or via a cable connection) and access the server side portal and the enterprise support center via the portal in order to dialog with the electronic board 1800 for diagnostic purposes or maintenance purposes. Such dialog may be accomplished under the supervision of the user such that the user may be asked by the system to perform certain actions to verify malfunctioning, for example. That is, the portable field computer 110 is capable of receiving instructions from the web server 140 of the server-side configuration 220 of the enterprise wide system 100 via the network 130 instructing a user of the portable field computer 110 to perform certain actions to verify malfunctioning of the appliance 120. However, many field service operations may occur while the portable field computer 110 is not connected to the web server 140. In such situations, field service engineers download updates from the web service on a periodic basis. This information is stored to the portable field computer 110 and is later used by the system during diagnostic and board configuration activities.

In accordance with another embodiment of the present invention, the electronic board 1800 may be capable of connecting (wired or wirelessly) to an external modem where the external modem is capable of entering the server side portal via the network 130. The enterprise support center may dialog with the electronic board to update or to monitor the board on a periodic basis. The external modem may be used by other appliances as well which are located in a person's home for the same purpose. In a further embodiment, the modem may be implemented directly inside the appliance as an integrated modem.

In summary, disclosed is a system and methods to provide appliance field support personnel with a tool that, together with proper interface modules, simplifies the execution of diagnostic procedures and provides an easy way to configure, reconfigure, or update electronic boards in the home on a client side of an enterprise wide system. The electronic boards serve as electronic controllers in the appliances and are programmable generic service boards. With such a system, it is possible to update and re-configure electronic boards and interact directly with an electronic controller of an appliance while an appliance is operating. Software, configuration data, and control data are downloaded from a server-side configuration of the enterprise wide system to update the electronic boards.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A client-side configuration of an enterprise wide system to provide appliance field support, said client-side configuration comprising:
    a portable field computer configured to access a web server of a server-side configuration of said enterprise wide system via a network;
    a client software application residing on said portable field computer and including computer-executable instructions providing a uniform user interface which is independent of an appliance type under test and which is common across all appliances of the enterprise wide system;
    an appliance independent of the field computer and the client software, wherein said appliance includes a programmable universal control board comprising programmable control firmware inside the appliance configured to be programmed for one of a plurality of appliance types of said enterprise wide system; and an appliance connection kit configured to operatively directly connect the programmable universal control board of the appliance with said portable field computer without communicating, over a network device.

2. The client-side configuration of claim 1 wherein communication between said appliance and said portable field computer is wireless.

3. The client-side configuration of claim 1 wherein said universal control board includes reprogrammable memories.

4. The client-side configuration of claim 1 wherein said portable field computer, having said client software application residing thereon, is configured to operatively interact with said universal control board of said appliance while said appliance is operating.

5. The client-side configuration of claim 1 wherein said portable field computer is further configured to download one or more of the group of: software, control data, and configuration data directly from a web server of a server-side configuration of said enterprise wide system via a network.

6. The client-side configuration of claim 1 wherein said portable field computer, having said client software application residing thereon, is configured to be used to select to diagnose said appliance or to select to configure said programmable universal control board of said appliance via the connection kit.

7. The client-side configuration of claim 1 wherein said portable field computer, having said client software application residing thereon, is configured to automatically identify said appliance when operatively connected thereto.

8. The client-side configuration of claim 1 wherein said client software application includes computer-executable instructions providing a monitor form configured to be displayed by said portable field computer to show a current state of said appliance.

9. The client-side configuration of claim 1 wherein said client software application includes computer-executable instructions providing a troubleshooting procedure and for displaying a series of dialog boxes that guide a user towards an actual reason for a detected fault.

10. The client-side configuration of claim 1 wherein said client software application includes computer-executable instructions providing a graph form configured to be displayed by said portable field computer to show an evolution, over time, of at least one relevant parameter during diagnostic operations.

11. The client-side configuration of claim 1 wherein said client software application includes computer-executable instructions providing an update dialog box configured to be displayed by said portable field computer to facilitate the updating of said programmable universal control board with one or more of the group of software, control data, and configuration data from a web server of a server-side configuration of said enterprise wide system via a network.

12. The client-side configuration of claim 1 wherein said portable field computer, having said client software application residing thereon, is further configured to report service information back to a web server of a server-side configuration of said enterprise wide system via a network.

13. The client-side configuration of claim 1 wherein said portable field computer, having said client software application residing thereon, is further configured to receive instructions from a web server of a server-side configuration of said enterprise wide system via a network instructing a user of said portable field computer to perform certain actions to verify malfunctioning of said appliance.

14. The client-side configuration of claim 1, wherein the appliance connection kit comprises:
 a cable configured to commutatively connect the field computer to the programmable universal control board.

15. The client-side configuration of claim 14 wherein the cable further comprises:
 a Universal Serial Bus (USB) cable configured to connect to the field computer;
 an appliance cable configured to connect to the appliance; and
 an Appliance Mini Interface (AMI) configured to connect between to the USB cable and the appliance cable.

16. The client-side configuration of claim 1 wherein the appliance is one of the group of a refrigerator, a stove, a microwave, a dishwashing machine, a clothes washing machine, and a clothes dryer.

17. The client-side configuration of claim 1, wherein the programmable universal control board is configured to be programmed to control a first one of a group of appliance models, and wherein the programmable universal control board is configured to be programmed to control one of the group of appliance models that is different than the first one, and wherein the programmable universal control board includes an interface for connecting the programmable universal control board to a field computer.

18. A client-side configuration of an enterprise wide system to provide appliance field support, said client-side configuration comprising;
 a programmable universal control board comprising programmable control firmware configured to be programmed to accommodate an appliance type of said enterprise wide system;
 a portable field computer configured to operatively connect to the programmable universal control board via an appliance connection kit without communicating over a network device; and
 a client software application residing on said portable field computer and including computer-executable instructions providing a uniform user interface which is independent of an appliance type under test and which is common across all appliances of the enterprise wide system.

19. The client-side configuration of claim 18 wherein the programmable universal control board is configured to be programmed based on a product number code that identifies the appliance type.

* * * * *